(12) United States Patent
Roll

(10) Patent No.: US 11,650,062 B2
(45) Date of Patent: May 16, 2023

(54) DOMESTIC DESTINATOR

(71) Applicant: Honor Rene'e Roll, Trussville, AL (US)

(72) Inventor: Honor Rene'e Roll, Trussville, AL (US)

( * ) Notice: Subject to any disclaimer, the term of this patent is extended or adjusted under 35 U.S.C. 154(b) by 0 days.

(21) Appl. No.: 17/341,674

(22) Filed: Jun. 8, 2021

(65) Prior Publication Data

US 2021/0389136 A1    Dec. 16, 2021

Related U.S. Application Data

(60) Provisional application No. 63/037,344, filed on Jun. 10, 2020.

(51) Int. Cl.
| | |
|---|---|
| *G06F 3/048* | (2013.01) |
| *G01C 21/34* | (2006.01) |
| *G06F 16/29* | (2019.01) |
| *G01C 21/36* | (2006.01) |
| *G06F 3/0482* | (2013.01) |

(52) U.S. Cl.
CPC ....... *G01C 21/343* (2013.01); *G01C 21/3667* (2013.01); *G06F 3/0482* (2013.01); *G06F 16/29* (2019.01)

(58) Field of Classification Search
CPC ... G01C 21/343; G01C 21/3667; G06F 16/29; G06F 3/0482
See application file for complete search history.

(56) References Cited

U.S. PATENT DOCUMENTS

| | | | |
|---|---|---|---|
| 5,272,638 A | 12/1993 | Martin et al. | |
| 5,964,821 A | 10/1999 | Brunts et al. | |
| 6,904,421 B2 | 6/2005 | Shetty | |
| 7,363,126 B1 | 4/2008 | Zhong et al. | |
| 8,538,686 B2 | 9/2013 | Gruen et al. | |
| 8,612,522 B1 | 12/2013 | Sylvain | |
| 9,288,240 B2 | 3/2016 | Sylvain | |
| 9,631,938 B2 | 4/2017 | Axelrod | |
| 9,978,109 B1 * | 5/2018 | Catalano | G06Q 50/16 |
| 10,024,671 B2 | 7/2018 | Schreier et al. | |
| 10,094,676 B1 * | 10/2018 | Ho | G01C 21/343 |
| 10,346,766 B1 | 7/2019 | Yao et al. | |
| 10,775,181 B2 | 9/2020 | Schreier et al. | |
| 11,137,766 B2 * | 10/2021 | Gier | G06F 9/4498 |
| 11,402,228 B2 * | 8/2022 | Matsumoto | G01C 21/3667 |
| 2006/0167616 A1 * | 7/2006 | Yamane | G08G 1/096741 |
| | | | 455/414.3 |
| 2008/0312826 A1 | 12/2008 | Shahrestani | |

(Continued)

FOREIGN PATENT DOCUMENTS

DE    1152217 A1    7/2001

*Primary Examiner* — David Phantana-angkool
(74) *Attorney, Agent, or Firm* — Antonio Papageorgiou, Esq.; Lombard Geliebter LLP

(57) ABSTRACT

A domestic destinator having an entry means is provided that is portable and may have a charging means, cable, wireless capabilities and or is an application suitable to run on computing devices and can include a monitor with a screen having a mounting accessory comprised of a base with a connecting means to a surface and a shaft. A domestic destinator capable of receiving destination entry to organize a list of locations in various visiting scenarios to display routing and navigation maps.

12 Claims, 8 Drawing Sheets

(56) References Cited

U.S. PATENT DOCUMENTS

| | | | |
|---|---|---|---|
| 2012/0246024 A1* | 9/2012 | Thomas | G06Q 30/06 |
| | | | 705/27.1 |
| 2013/0046467 A1 | 2/2013 | Iwane et al. | |
| 2014/0052374 A1* | 2/2014 | Hoch | G01C 21/343 |
| | | | 701/533 |
| 2017/0356755 A1* | 12/2017 | Strawn | G01C 21/3676 |
| 2018/0060980 A1* | 3/2018 | Stachowski | G06Q 10/0631 |
| 2018/0314991 A1 | 11/2018 | Grundberg | |
| 2021/0209946 A1* | 7/2021 | Eilertsen | G01C 21/3492 |
| 2021/0356288 A1* | 11/2021 | Hajj | G01C 21/3423 |
| 2021/0381847 A1* | 12/2021 | Cajias | G09B 29/106 |
| 2021/0389136 A1* | 12/2021 | Roll | G06F 16/29 |

\* cited by examiner

DOMESTIC DESTINATOR

RELATED APPLICATION

This application claims the benefit of U.S. (Provisional) Application No. 63/037,344 filed Jun. 10, 2020, which is incorporated herein by reference.

BACKGROUND OF THE INVENTION

The present application relates to destinators, and, in particular, to devices used for domestic navigational purposes including determining the best route to a destination when many variables come into play.

Late In the 19th century and early in the 20th century the unique American economic system gave rise to massive manufacturing concerns able to produce massive numbers of products. These companies sent out thousands of persons to create demand for their products by word-of-mouth communication. At the time, this was one of the most efficient means of communication. No other nation developed an organized sales force to the extent of what was organized in the United States by the early 20th century.

The revolution in selling had many wonderful consequences but it also created many new problems to be solved. One such problem was how a sales person's routes are planned. This problem is so massive it gave rise to optimization theory known as the Traveling Salesperson Problem. Sometimes this is also referred to as the Traveling Politician Problem.

To understand this Problem by way of example, the sales person wants to visit a few locations. The person knows the names of the locations and wants to know what is the shortest route to follow to visit each location in the most efficient way before returning home. Of course, there are many variations to this problem which can be posed and many various efficiencies that can be calculated. The essence of the solution to this problem is to save time and money.

The growth of larger cities, telecommunications and especially our entry into the digital age has diminished focus on this problem. Because much of the word-of-mouth communication largely happens within this framework of emerging technology.

But, in more recent times there has begun a cultural exodus from larger cities to rural areas. As well, there is a rise in human desire for more personalized face-to-face communication. Entrepreneurs and politicians are beginning to recognize that a large untapped sales market exists outside the norms of using only telecommunication channels. While large corporations have sophisticated systems and costly devices to send out their sales persons, entrepreneurs, small business persons, volunteers, fund raisers and emerging politicians do not have the same means and resources. They need a simple, economical, easy to use device enabling them to travel from destination to destination to create demand for their products, services and ideas by face-to-face word of mouth communication.

Accordingly, there is a need for a device capable of serving the domestic sales person/politician to determine the best route when many variables come into play, at a more affordable price to the consumer.

SUMMARY OF THE INVENTION

A device is provided that includes a processor and computer memory with software stored thereon that when executed causes the processor to perform a method that includes the steps of: displaying a first interface screen with form elements therein for users specify a set of destinations; receiving a plurality of disparate destinations; displaying a second interface screen comprising a list of the destinations and at least one form element for users to specify a sort order from a plurality of available sort orders for the destinations, wherein the sort order comprises a sort by ZIP Code and a sort by distance without regard to ZIP Code; receiving a sort order selection; and resorting the list of destinations based on the sort order selection.

In one embodiment, the form element for specifying a set of destinations includes a button that when selected enables the device to receive the set of destinations by voice.

In one embodiment, the sort order comprises a sort order wherein the set of destinations are arranged from farthest to nearest relative to a starting point.

In one embodiment, the sort order comprises a sort order wherein the set of destinations are arranged from nearest to farthest relative to a starting point.

In one embodiment, the sort order comprises a sort order wherein the set of destinations are arranged in a circular loop.

In one embodiment, the method further includes displaying a third interface screen that includes the set of destinations overlaid on a map, and providing navigation guidance to each of the destinations overlaid on the map.

In one embodiment, the device includes a mounting accessory comprising a base and a means for removably attaching the base to a vehicle.

In one embodiment, the device includes a monitor and a flexible shaft, wherein the flexible shaft adjustably mounts the monitor to the base.

In one embodiment, the first interface screen comprises at least one form element for users to skip a destination on the list and wherein the processor provides navigation guidance to each of the destinations except for the skipped destination.

In one embodiment, the first interface screen comprises at least one form element for users to pause and resume navigation guidance.

In one embodiment, the device includes a memory port that receives a memory card with the set of destinations stored thereon, the method further comprising uploading the set of destinations from the memory card.

In one embodiment, the device includes a communication element that enables the device to receive the set of destinations wirelessly, the method further comprising receiving a file comprising the set of destinations wirelessly.

In one embodiment, the processor is operable to receive files having the set of destinations stored thereon in a structured format, the method comprising receiving a file comprising the set of destinations stored thereon.

In one embodiment, the structure format comprises comma separated values.

In one embodiment, the device includes a camera that enables the device to capture an image of the set of destinations, recognize the set of destinations, and display the recognized set of destinations on a map.

Additional aspects of the present invention will be apparent in view of the description which follows.

DETAILED DESCRIPTION OF THE INVENTION

Figure 1:
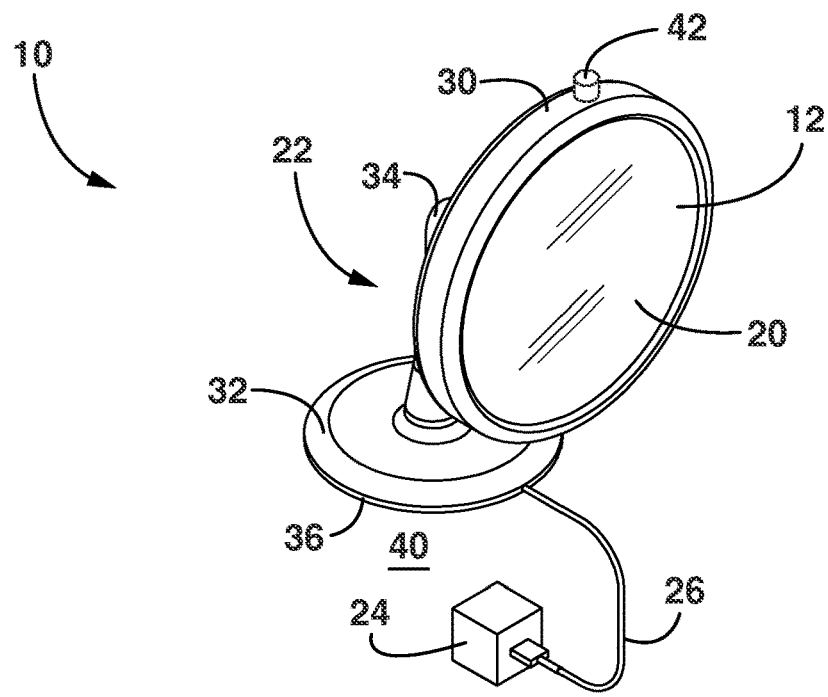
FIG. 1 is a perspective view of one side and the front of the domestic_destinator according to one embodiment of my new design.
Figure 2:
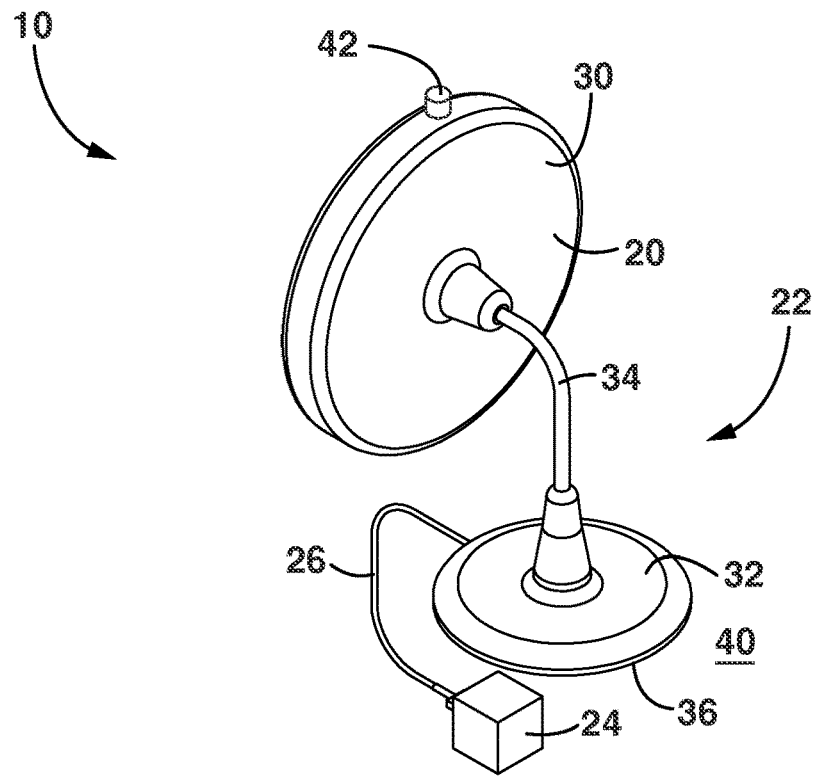
FIG. 2 is a perspective view of one side and the back of the domestic_destinator according to one embodiment of my new design.
Figure 3:
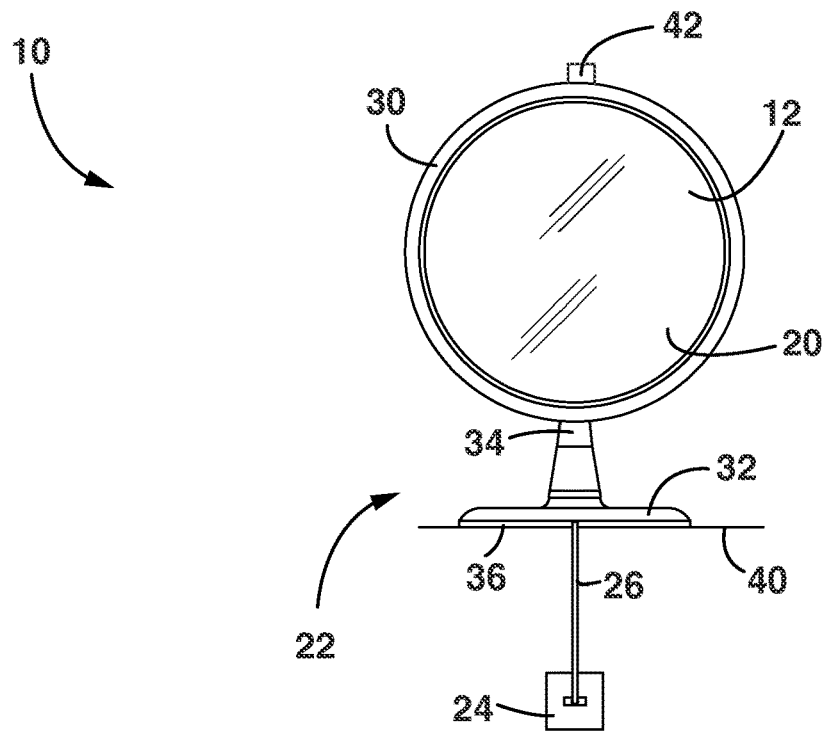
FIG. 3 is a front view thereof.
Figure 4:
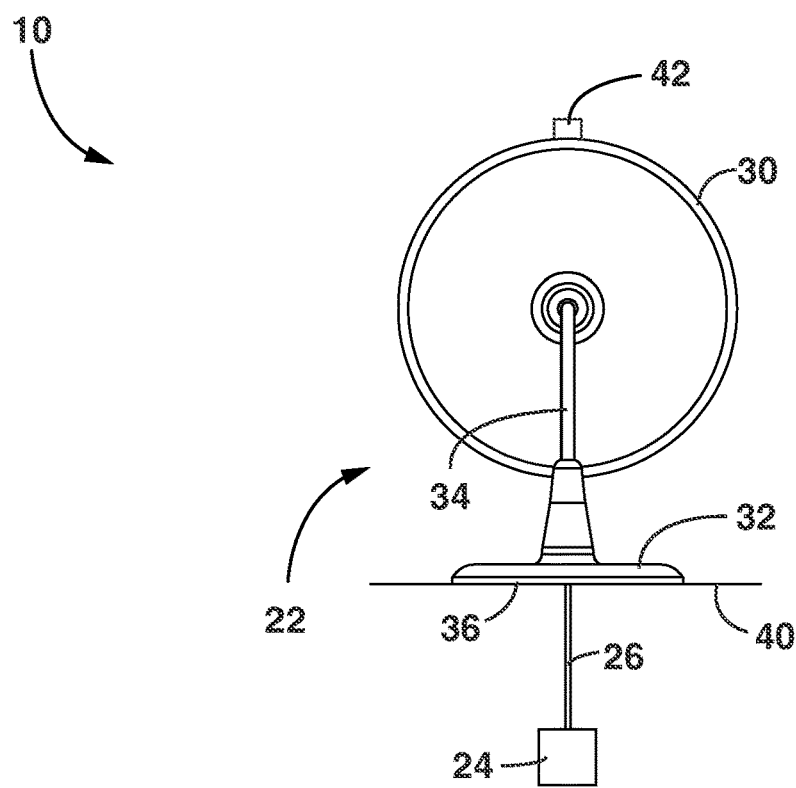
FIG. 4 is a back view thereof.
Figure 5:
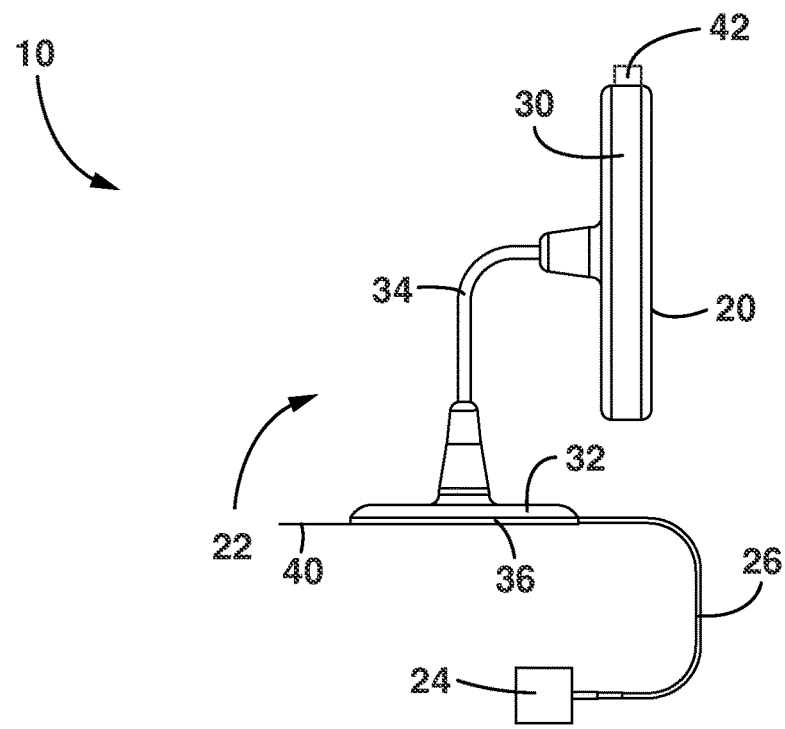
FIG. 5 is a left side view thereof.
Figure 6:
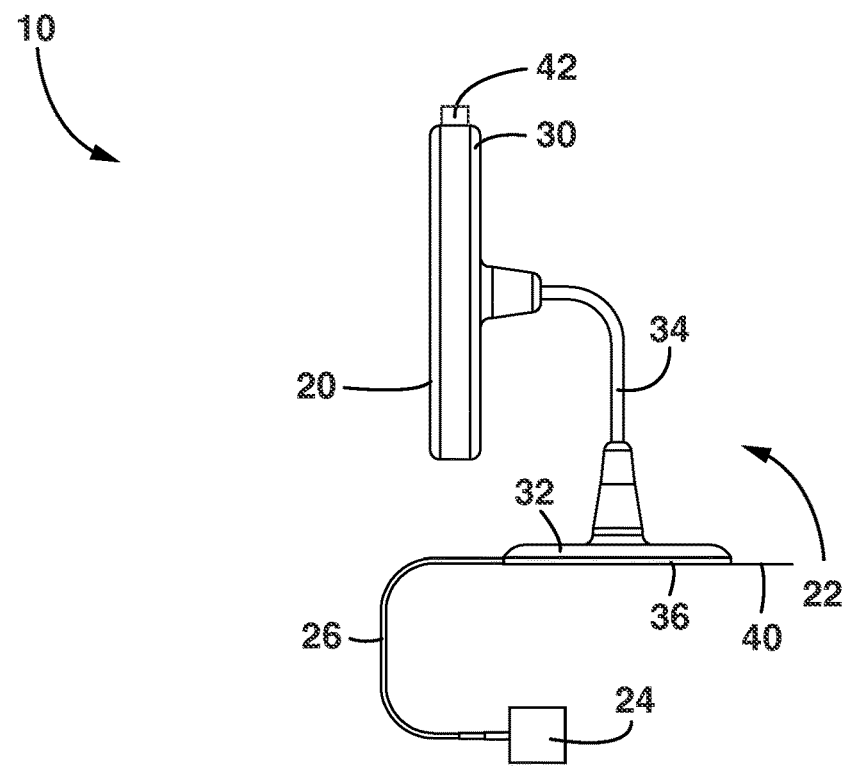
FIG. 6 is a right side view thereof.
Figure 7:
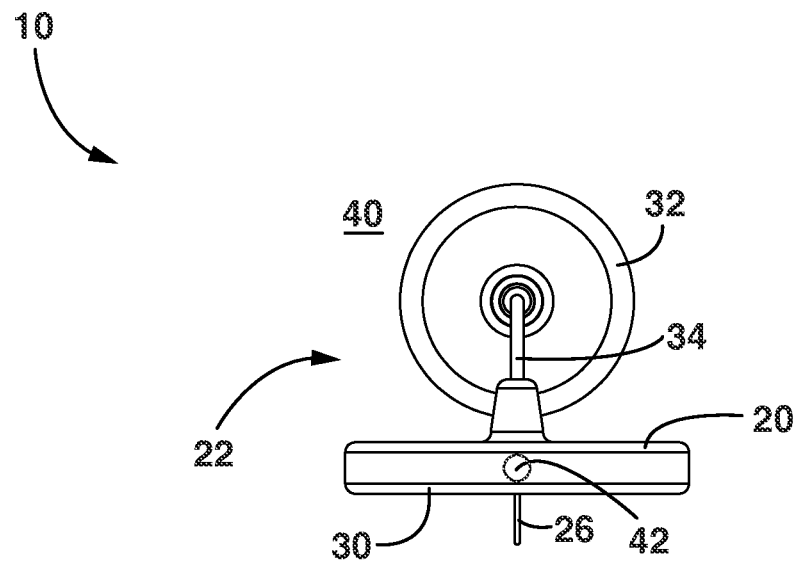
FIG. 7 is a top view thereof.
Figure 8:
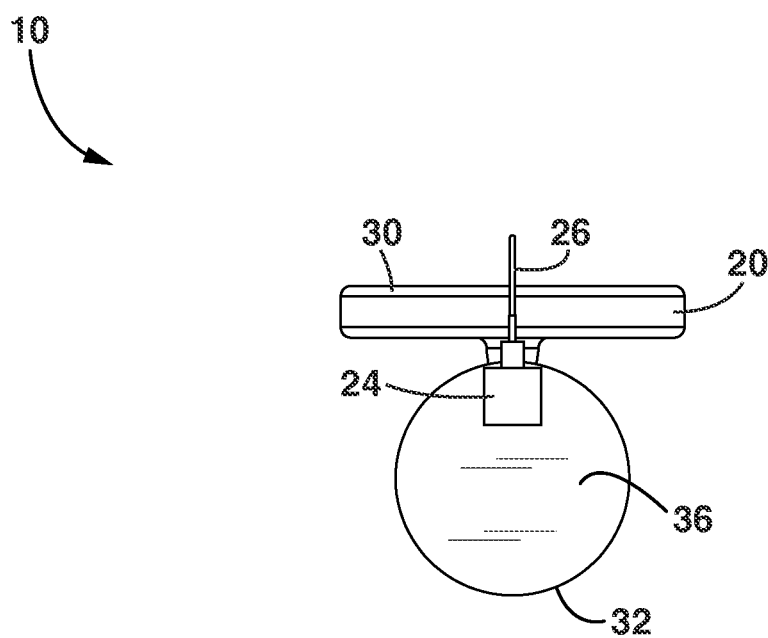
FIG. 8 is a bottom view thereof.

Referring to FIG. 1 through FIG. 15, a domestic destinator 10 is provided that can receive multiple addresses and can put them into groups by ZIP Code or by distance disregarding ZIP Codes. This is done by selecting a specific prompt or order from a digital touch/interface screen 12 or other entry means 20, such as voice, keyboard or other data entry means 20. The domestic destinator 10 is available as portable device 14 or an application 16 loaded on a computing device 18.

To understand how a domestic destinator 10 works by way of an example, if an entrepreneur was going to sell and distribute a product, they would identify parties to visit in a particular area. After making the list, the entrepreneur would put the parties into location categories. One way this might be done by grouping the parties by their ZIP Codes. A map would also be needed for planning purposes. Unfortunately, a global positioning system or other computing device 18 is not much help with this situation. Most global positioning systems or other computing devices 18 do not have the capability of solving the problem of grouping parties disparately located. Also, most global positioning systems or other computing devices 18 do not allow efficient entry of multiple addresses.

The portable domestic destinator device 10 can be equipped with voice entry means 20, keyboard entry means 20 capability or other entry means 20 and has the ability to receive multiple addresses at one time and group them into groups, such as by ZIP Codes, forming lists of different ZIP Codes. ZIP Codes can also be entered Independently and formed into lists.

Figure 13:
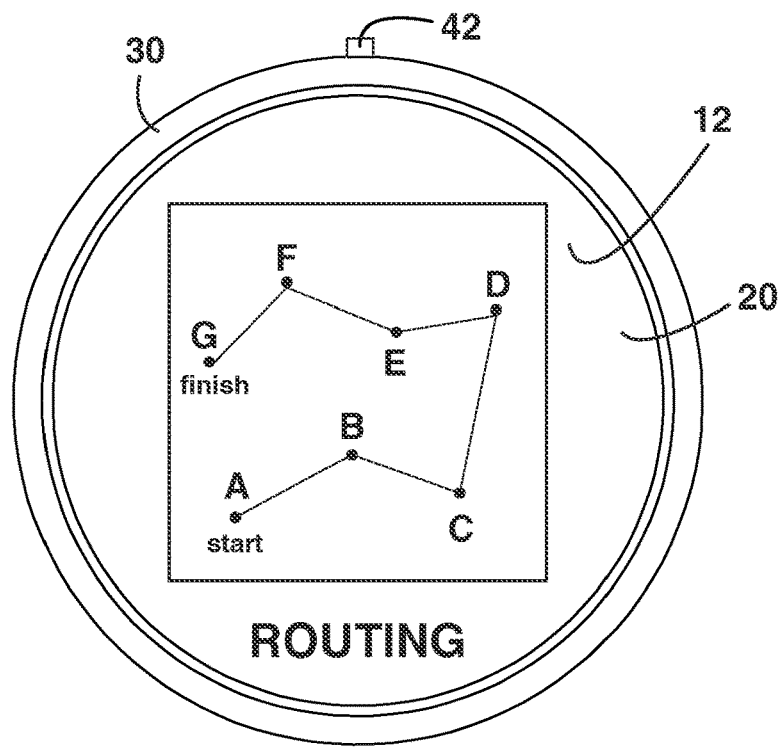
FIG. 13 is a front view of the routing screen.

The ZIP Code lists can be put into sequence of farthest destination to nearest destination relative to the starting point, nearest destination to starting point and ending in farthest address destination, or in a circular route from start back to start, as shown in FIG. 13. This is done by the selection of appropriate touch capable screen 12 prompts or commands. There is also a touch capable screen 12 prompt that puts the list of addresses in order as above mentioned but disregards the ZIP Codes altogether.

Figure 9:
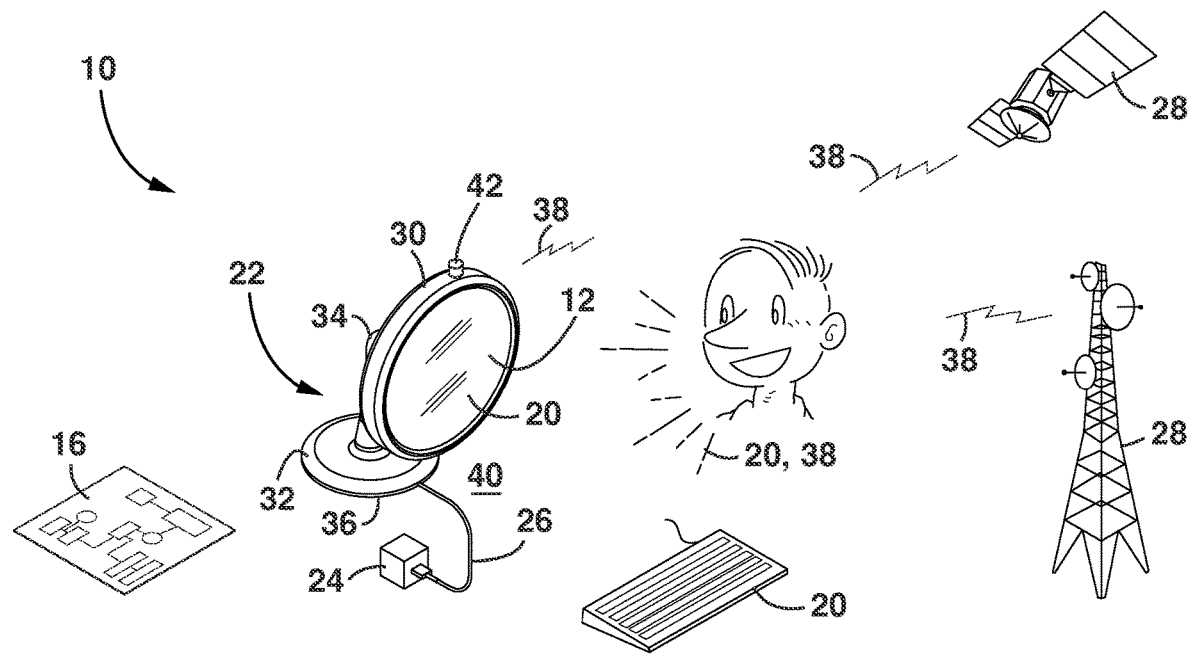
FIG. 9 is a schematic representative view of the domestic_destinator.
Figure 10:
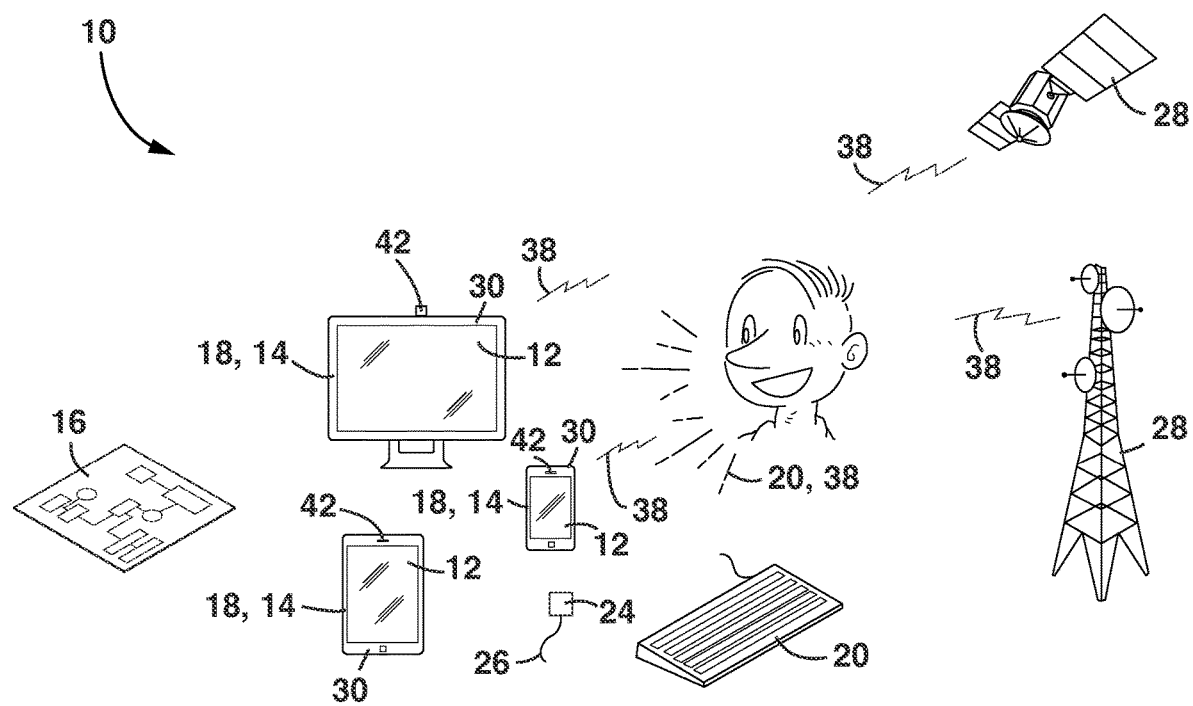
FIG. 10 is a schematic representative view of another embodiment of the domestic destinator.
Figure 11:
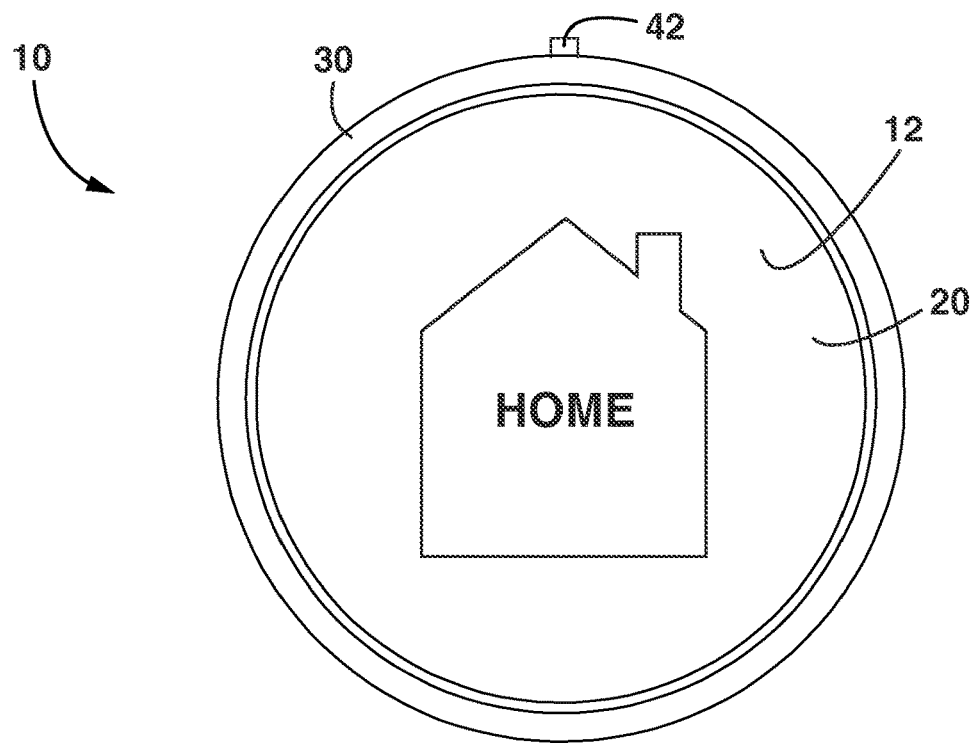
FIG. 11 is a front view of the home screen.
Figure 12:
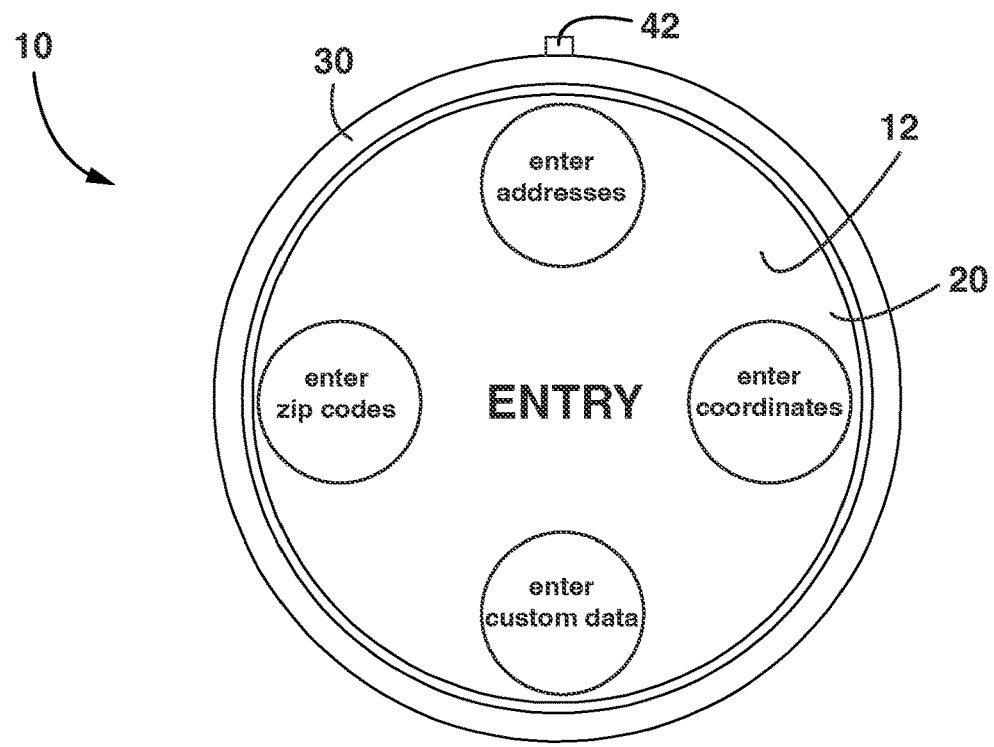
FIG. 12 is a front view of the entry screen.

The domestic destinator 10 comes with internal memory capability. The portable domestic destinator 10 comes with a display or monitor 30, mounting accessory 22, charging means 24 and a cable 26, such as a USB cable 26. The portable domestic destinator 10 device can communicate with other communication devices 28, such as satellite communication devices 28 and tower communication devices 28 to name some examples, as shown in FIGS. 9-10.

The monitor 30 in at least one embodiment is about 5 inches in diameter and about 0.75 inches thick having an on and off power switch, one or more accessory connection points for input devices such as keyboards, microphones or other entry means 20, to name a few. A monitor 30 can have an attachment means to a shaft 34. A monitor 30 can receive voice communication entry means 20 and also has a screen 12 such as a touch screen 12 for visual, tactile, kinetic or other forms of communication. In other embodiments monitor 30 can be manufactured in other shapes, dimensions or forms.

The mounting accessory 22 is comprised of a base 32, shaft 34 and connection means 36. A mounting accessory 22 serves as a capable means to connect a monitor 30 with the surface 40. A surface 40 can be a surface such as a dashboard in a vehicle or any surface 40 that is flat, textured or variable in an irregular nature.

The base 32 measures about 4.5 inches in at least one embodiment and is about 0.25 inches thick and can be manufactured from plastic, rubber or composite material that is formable or of a soft durometer having ability to conform to any surface 40. A base 32 can have an attachment means to a shaft 34. In other embodiments base 32 can be manufactured in other shapes, dimensions or forms.

The connection means 36 has the ability to connect to base 32 and to surface 40 forming a fixed yet removable, at will, connection. A connection means 36 in at least one embodiment measures about 4.5 inches in diameter and is about 0.125 inches thick. In at least one embodiment a connection means 36 can be manufactured from a multifunctional reusable double sided waterproof tape, produced by nano technology, simulating millions of microscopic suction cups that lock and hold tight to any service. In other embodiments connection means 36 can be manufactured from other materials, shapes, dimensions, forms or other ways suitable for manufacturing a connection means 36.

The shaft 34 measures about 0.5 inches in diameter and is about 9 inches in length in at least one embodiment and can have flared ends to connect a monitor 30 and a base 32. The flared ends can be flexible or ridged in nature and serve to mechanically connect to a monitor 30 and a base 32. Shaft 34 can be manufactured from metal, plastic, rubber or composite material that is formable, of a formable configuration or articulate with segments or joints.

In at least one embodiment of a domestic destinator 10 one or more detecting sensors 42 can be present. The objective of the detecting sensor 42 is to make data entry easier. A detecting sensor 42 can be any kind of a sensor such as a motion detector to detect and enter hand signals or other symbols. A camera can also be a detecting sensor 42 to detect visual data for entry into a domestic destinator 10, to name a second example. For example, the system may include a camera for scanning written text (handwritten or otherwise) and optically recognizing the scanned content. The system may thereafter use the recognized text, compare that data with properly formatted addresses to determine, and if there is a match, use the formatted address in the list and/or mapping of destination. A detecting sensor 42 can also serve as a entry means 20 and wireless communication 38 means of a domestic destinator 10.

The application 16 when downloaded to a GPS or other computing device 18, works in conjunction with the equipped capabilities of the GPS or other computing device 18. The receiving computing device 18 must satisfy the functionality of the application 16. Application 16 capabilities are; global positioning, global map updates; multiple languages; 2D-3D visuals; Wi-Fi connectivity; wireless connectivity; turn by turn voice navigation; detour function capability; compatibility with Google and Siri; ability to select starting point; ability to select ending point; ability to skip someone on a list; ability to have a stop, pause and go icon; advanced lane change and intelligent error correction as well as other functionality.

The domestic destinator 10 application 16 can run on all computing devices 18. That is, all computing devices 18 satisfying the functionality of the application 16. Some examples are: laptops, desktops, GPS devices, cell phones—Mac and android as well as tablets.

Figure 14:
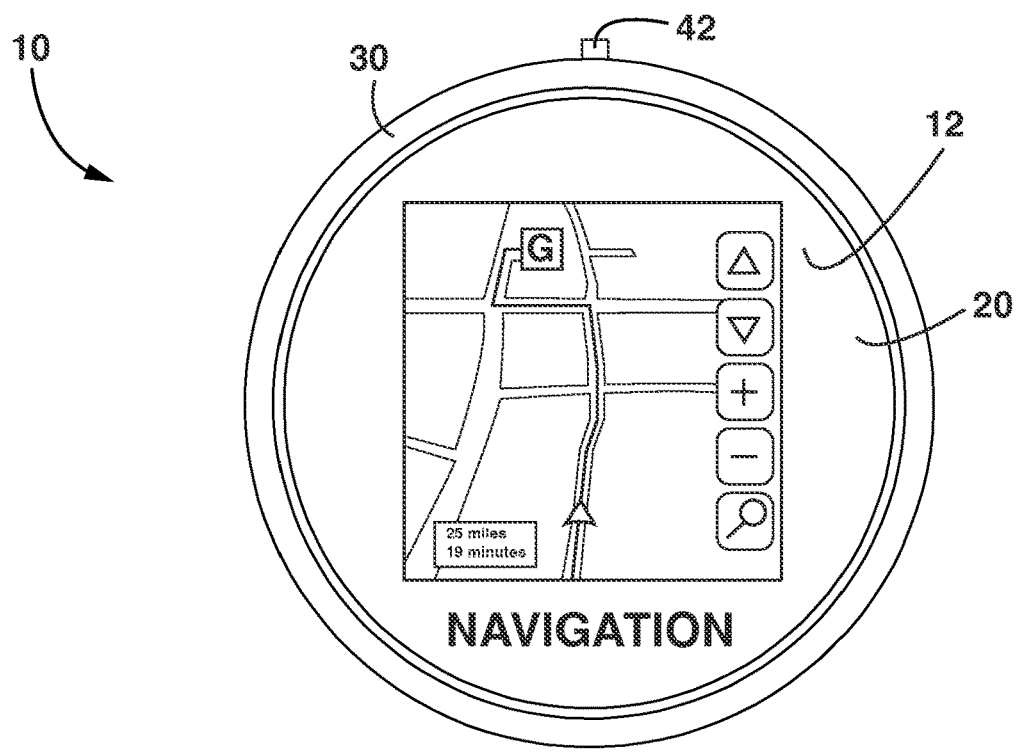
FIG. 14 is a front view of the navigation screen.
Figure 15:
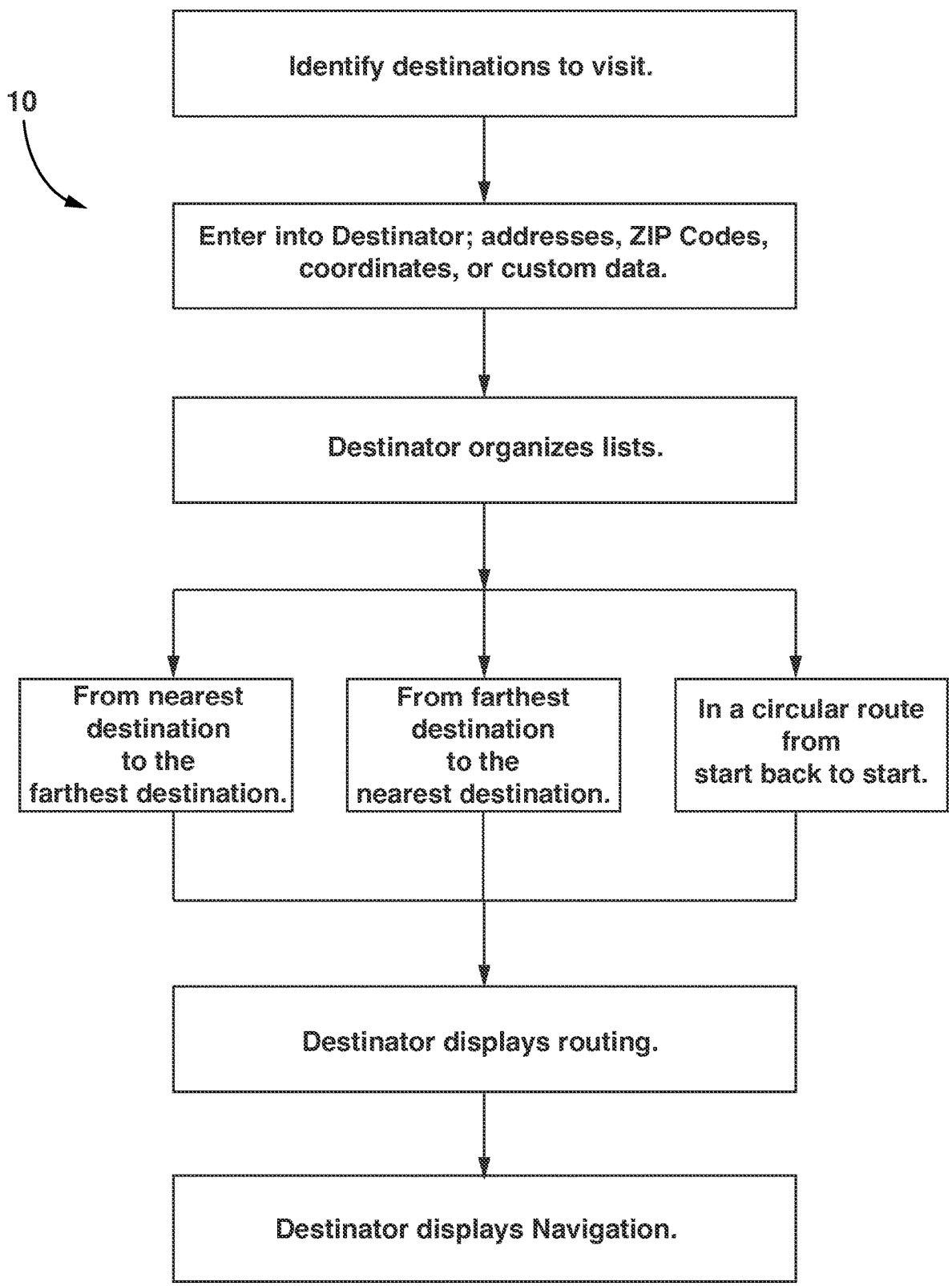
FIG. 15 is a flow chart of the domestic destinator/application.

To name some features. The digital touch screen 12 is sizable enough for comfort of viewing. Prompts or specific mode selections are easy to read. Map navigation of routes is easy to understand. Visual map of road and street names, location benchmarks, and turn by turn navigation to lead you to your destinations, as shown in FIG. 14.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A device comprising a processor and computer memory with software stored thereon that when executed causes the processor to perform a method comprising:
    displaying a first interface screen with form elements therein for users specify a set of destinations;
    receiving a plurality of disparate destinations;
    displaying a second interface screen comprising a list of the plurality of destinations and at least one form element for users to specify a sort order from a plurality of available sort orders for the destinations, wherein the plurality of available sort orders comprise a sort by ZIP Code from nearest to farthest destination from the start location, a sort by distance from nearest destination to farthest destination from the start location without regard to ZIP Code, and a circular sort that sorts the plurality of destinations to form a route from the start location and back to the start location;
    receiving a circular sort order selection; and
    resorting the list of destinations based on the circular sort order selection, wherein the plurality of destinations include a first set of destinations, a second set of destination, and a destination farthest from a start location, and wherein in the circular sort order the processor sorts the first set of destinations in a first sequence sorted based on distance from the closest to the farthest from the start point, followed then by the destination farthest from a start location, and followed then by the second sequence sorted based on distance from the farthest to the closest from the starting point, wherein destinations in the first sequence define a first path from the start location to the destination farthest from the start location, and destinations in the second sequence define a second path from the destination farthest from the start location to the start location, and wherein the first path and the second path do not overlap.

2. The device of claim 1, wherein the form element for specifying a set of destinations comprises a button that when selected enables the device to receive the set of destinations by voice.

3. The device of claim 1, the method further comprising displaying a third interface screen that includes the set of destinations overlaid on a map, and providing navigation guidance to each of the destinations overlaid on the map.

4. The device of claim 1, comprising a mounting accessory comprising a base and a means for removably attaching the base to a vehicle.

5. The device of claim 4, comprising a monitor and a flexible shaft, wherein the flexible shaft adjustably mounts the monitor to the base.

6. The device of claim 1, wherein the first interface screen comprises at least one form element for users to skip a destination on the list and wherein the processor provides navigation guidance to each of the destinations except for the skipped destination.

7. The device of claim 6, wherein the first interface screen comprises at least one form element for users to pause and resume navigation guidance.

8. The device of claim 1, comprising a memory port that receives a memory card with the set of destinations stored thereon, the method further comprising uploading the set of destinations from the memory card.

9. The device of claim 1, comprising a communication element that enables the device to receive the set of destinations wirelessly, the method further comprising receiving a file comprising the set of destinations wirelessly.

10. The device of claim 1, wherein the processor is operable to receive files having the set of destinations stored thereon in a structured format, the method comprising receiving a file comprising the set of destinations stored thereon.

11. The device of claim 10, wherein the structure format comprises comma separated values.

12. The device of claim 1, comprising a housing and a camera that enables the device to capture an image of written text of the set of destinations, recognize the set of destinations, and display the recognized set of destinations on a map, wherein the camera is located on a high point on the housing and wherein the device is further enabled by the camera to detect motion and receive data entry via hand signals.

* * * * *